(12) United States Patent
Imaki et al.

(10) Patent No.: US 9,798,830 B2
(45) Date of Patent: Oct. 24, 2017

(54) STREAM DATA MULTIPROCESSING METHOD

(75) Inventors: Tsuneyuki Imaki, Tokyo (JP); Itatu Nishizawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 14/398,622

(22) PCT Filed: Sep. 14, 2012

(86) PCT No.: PCT/JP2012/073568
§ 371 (c)(1),
(2), (4) Date: Feb. 13, 2015

(87) PCT Pub. No.: WO2014/041673
PCT Pub. Date: Mar. 20, 2014

(65) Prior Publication Data
US 2015/0149507 A1    May 28, 2015

(51) Int. Cl.
*G06F 7/00* (2006.01)
*G06F 17/30* (2006.01)

(52) U.S. Cl.
CPC .. *G06F 17/30958* (2013.01); *G06F 17/30516* (2013.01)

(58) Field of Classification Search
CPC ......... G06F 17/30958; G06F 17/30516; G06F 17/30442; G06F 17/30466; G06F 17/30592; G06F 17/30477
See application file for complete search history.

(56) References Cited

U.S. PATENT DOCUMENTS

| | | | | |
|---|---|---|---|---|
| 5,212,789 A * | 5/1993 | Rago | ............... | G06F 17/30377 |
| 5,745,746 A * | 4/1998 | Jhingran | ........... | G06F 17/30451 |
| 6,014,655 A * | 1/2000 | Fujiwara | ............. | G06F 17/3046 |
| 6,081,621 A * | 6/2000 | Ackner | ................. | G06K 9/186 |
| | | | | 382/209 |
| 6,094,645 A * | 7/2000 | Aggarwal | ......... | G06F 17/30893 |
| | | | | 706/47 |
| 6,131,092 A * | 10/2000 | Masand | ............ | G06F 17/30985 |
| 6,157,923 A * | 12/2000 | Ivler | ................. | G06F 17/30973 |
| 7,493,337 B2 * | 2/2009 | Chaudhuri | ........ | G06F 17/30306 |

(Continued)

FOREIGN PATENT DOCUMENTS

JP     2008-146503 A    6/2008
JP     2010-108152 A    5/2010
(Continued)

*Primary Examiner* — Daniel Kuddus
(74) *Attorney, Agent, or Firm* — Mattingly & Malur, PC

(57) ABSTRACT

A query parser that converts query definition into a query graph and decides the execution order of operators is installed, a set of consecutive operators in the execution order is called a stage, the total of calculation costs of operators configuring each stage is called a calculation cost of the stage, the query graph is divided into multiple stages such that the calculation cost of each stage becomes a value less than a value dividing the total cost of all operators by the number of calculation cores, and each calculation core extracts tuples one by one from an input stream, and, when taking charge of and executing processing of the tuples from the entrance to exit of the query graph, before the execution of each stage, confirms whether processing of the stage is completed for a tuple previous to a charge tuple.

7 Claims, 7 Drawing Sheets

(56) References Cited

U.S. PATENT DOCUMENTS

| | | | | |
|---|---|---|---|---|
| 8,402,015 B2* | 3/2013 | Imaki | ................ | G06F 17/30516 |
| | | | | 707/713 |
| 8,788,481 B2* | 7/2014 | Imaki | ................ | G06F 17/30516 |
| | | | | 707/713 |
| 8,880,493 B2* | 11/2014 | Chen | ................ | G06F 17/30516 |
| | | | | 707/706 |
| 2003/0120682 A1* | 6/2003 | Bestgen | ............ | G06F 17/30436 |
| 2010/0106946 A1* | 4/2010 | Imaki | ................ | G06F 17/30516 |
| | | | | 712/220 |
| 2010/0229178 A1* | 9/2010 | Ito | ........................ | G06F 9/5083 |
| | | | | 718/104 |
| 2011/0029554 A1* | 2/2011 | Ito | ..................... | G06F 17/30516 |
| | | | | 707/769 |
| 2013/0173587 A1* | 7/2013 | Imaki | ................ | G06F 17/30516 |
| | | | | 707/713 |
| 2013/0226909 A1* | 8/2013 | Katsunuma | ....... | G06F 17/30554 |
| | | | | 707/722 |
| 2014/0289221 A1* | 9/2014 | Imaki | ................ | G06F 17/30516 |
| | | | | 707/718 |

FOREIGN PATENT DOCUMENTS

| | | |
|---|---|---|
| JP | 2010-204880 A | 9/2010 |
| JP | 2011-034255 A | 2/2011 |
| WO | 2012/046316 A1 | 4/2012 |

* cited by examiner

STREAM DATA MULTIPROCESSING METHOD

TECHNICAL FIELD

The present invention relates to a scale-up technique of stream data processing.

BACKGROUND ART

Against a background that there is a growing demand for analyzing information that continuously occurs at a high rate in real time like the automation of stock trading, the upgrading of traffic information processing and the analysis of click streams, and for promptly taking action against the occurrence of important events, stream data processing that realizes real-time processing of high-rate data attracts attention. Since the stream data processing is a general-purpose middleware technique applicable to various kinds of data processing, it is possible to reflect data of the real world to the business in real time while responding to a rapid change in a business environment that is not supported if the system is constructed for each case.

A stream targeted by the stream data processing is time-series data in which a tuple that is data with a time stamp continuously comes. When the user of the stream data processing defines a monitoring rule with respect to this stream as a query, query definition is converted into a query graph. The query graph is a digraph in which a processing unit called an operator is assumed to be a node and a tuple queue between the operators is assumed to be an edge. By causing individual tuples configuring an input stream to pass the query graph, processing is advanced like a data flow. Since it is processing of the data flow type, by performing multiple division of the query graph and performing parallel processing in a pipeline manner by multiple calculation resources, it is possible to improve the throughput.

Meanwhile, even for the time from the occurrence of an event to the generation of action, that is, even for latency, a very strict request of the millisecond-to-microsecond order is imposed. Therefore, in the stream data processing, it is an important technical issue to make the latency performance and the throughput performance compatible.

There is JP 2010-204880 A (PTL 1) as a background art of this technical field. This publication discloses "Throughput related to query processing of stream data of a stream data processing system is improved. When a data delay with respect to a query group that groups queries occurs, a scheduler of a server device calculates the query load evaluation value of each query configuring the query group on the basis of at least one information of input flow rate information and latency information, divides the queries configuring the query group into multiple query groups such that the sums of query load evaluation values are substantially equal to each other, and reassigns the divided multiple query groups to respective processors" (see the abstract of PTL 1).

Moreover, there is JP 2008-146503 A (PTL 2). The publication discloses "There is provided a multiprocessor system including a processor unit (PU) for control, multiple subprocessor units (SPU) for operation, each of which has a local memory, and a main memory. In a multi-task environment in which multiple tasks are executed in parallel by performing time division of the calculation resources of each SPU and assigning them to multiple tasks, an operating system that operates on multiple SPUs includes: a function of constructing a pipeline processing system to execute specific processing including multiple tasks of different loads by giving an execution result of a task to other tasks and operating the pipeline processing system multiple times; and a function of loading a task whose context is saved to the main memory and which is in a ready condition to the local memory of an SPU in which any task is not executed, and executing the task" (see the abstract of PTL 2).

Moreover, there is JP 2010-108152 A (PTL 3). This publication discloses "There is provided a stream data processing method and system that can realize general data processing including recursive processing at a low latency. The stream data processing system constructs a single operator graph from the execution tree of multiple queries, decides the operator execution order such that the execution of stream computation is advanced in one direction from an input to an output, and monitors the ignition times of an external ignition operator that inputs external system data and an internal ignition operator that generates data in a time-limited manner, and an operator execution control unit assumes an operator of the earliest ignition time as a base and repeats processing that concludes processing in the operator graph of the time according to the decided operator execution order" (see the abstract of PTL 3).

CITATION LIST

Patent Literature

PTL 1: JP 2010-204880 A
PTL 2: JP 2008-146503 A
PTL 3: JP 2010-108152 A

SUMMARY OF INVENTION

Technical Problem

In the individual technologies of the literatures described in the foregoing paragraphs, a problem remains in the balance between the latency and the throughput. In the method of PTL 3, since each tuple is subjected to centralized processing by one calculation thread from the input to exit of the query graph, the individual tuples are assumed to be processed by the shortest paths, and it becomes possible to suppress the latency. However, since single thread execution is presumed, it is not possible to contribute to throughput improvement by multiple calculation resources such as multiple CPUs and multiple cores.

The method of PTL 1 monitors the calculation load of each stage in the pipeline processing by multiple calculation resources and avoids the bottleneck of processing by dividing a stage in which the load increases into multiple stages again. However, it is difficult to complexly avoid the bottlenecking in the pipeline processing.

The problem noted here is described using examples illustrated in FIGS. 2 and 3. The query graph illustrated in FIG. 2 is configured by ten operators 201 to 210 of OP1 to OP10. Here, the calculation cost of each operator is assumed to be the value in the rectangle attached to the operator. The sum of the calculation costs, that is, the processing time per one tuple is 100. Moreover, query execution in four calculation cores is assumed in this example. Here, this query graph is divided into four stages 301 to 304 of A to D as illustrated in FIG. 3. As for the calculation cost of each stage, it is 21 in stage A (301), 23 in stage B (302), 30 in stage C (303) and 26 in stage D (304). This division is defined such that the calculation cost of each stage becomes near 25 which is one fourth (core number) of the total cost. The ratio of the processing time of each stage to the processing time of one tuple is as illustrated in 310.

Here, in a case where the tuple comes at intervals of ¼ of the tuple processing time, each tuple is assumed to be processed in each calculation core by the schedule as illustrated in a time chart 311. Here, processing of tuple n in stage X is written as Xn. Moreover, processing in stages A, B, C and D is assumed to be executed on calculation cores 0, 1, 2 and 3 respectively. The time chart 311 shows a state where, in the processing of stage C which is executed by the calculation core 2, processing Cn of tuple n waits until tuple processing C(n−1) of tuple n−1 previous thereto is completed. Thus, in the pipeline processing, there is a problem that the throughput performance and the latency performance are not improved due to a stage of the longest processing time. This problem is avoided when it is possible to equally divide a query graph such that the processing times of four stages all become just ¼ of the processing time of one tuple, but such a condition is not established in most queries.

PTL 2 shows a task scheduling method in a case where one specific processing is divided into multiple tasks of respective processing times. It is also applicable to pipeline processing of stream data by reading the specific processing as query processing of one tuple and the task as a stage. According to this method, there is assumed an execution pattern in which, whenever processing of one stage is finished, each calculation core performs queuing of the processing context (intermediate processing state of the tuple) once, and another available calculation core restarts processing of the context extracted from the queue head. In this method, processing with respect to one tuple temporarily stops at each stage end, which becomes an overhead with respect to the latency performance.

Regarding parallel processing of a pipeline type, there is also a method of parallel processing by data division. When processing of stock prices is assumed as an example, it is a method in which a query graph that executes the identical query is prepared for each issue and the query graphs are switched according to the value of the issue attribute of an input tuple. Here, since each operator configuring the query graph has an execution state (for example, in a case where the price moving average is calculated, the sum of prices on a sliding window and the value of the price data number are held as execution states, and, when a new tuple is input, these execution states are updated), it is necessary to always process tuples of the identical issue attribute by the identical query graph. Therefore, when data of a specific issue concentrates, an effect of parallelization cannot be acquired. Moreover, the data division processing is applicable only to a query in which calculation is independently possible every attribute. For example, it is not applicable to the calculation of a stock index intended for the stock prices of all issues.

Solution to Problem

A feature of a representative processing method of the present invention to solve the above-mentioned problem is given as follows:

A stream data multiprocessing method executed by a stream processing system which includes a query parser to convert query definition into a query graph and decide the execution order of operators and which includes multiple query execution threads, has features that: a set of consecutive operators in the execution order is called a stage; the total of calculation costs of operators configuring each stage is called a calculation cost of the stage; the query graph is divided into multiple stages such that the calculation cost of each stage becomes a value less than a value dividing the total cost of all operators by the number of calculation cores; and each calculation core extracts tuples one by one from an input stream, and, when taking charge of and executing processing of the tuples from the entrance to exit of the query graph, before the execution of each stage, confirms whether processing of the stage is completed for a tuple previous to a charge tuple.

Advantageous Effects of Invention

According to the stream data multiprocessing method according to the above-mentioned feature of the present invention, low latency performance acquired by processing a query graph by the shortest path and throughput improvement acquired by operating multiple threads for the number of calculation cores in parallel are made compatible. Therefore, it is possible to acquire the effects of low latency and high throughput.

DESCRIPTION OF EMBODIMENTS

In the following, an embodiment is described using the drawings.

Figure 1:
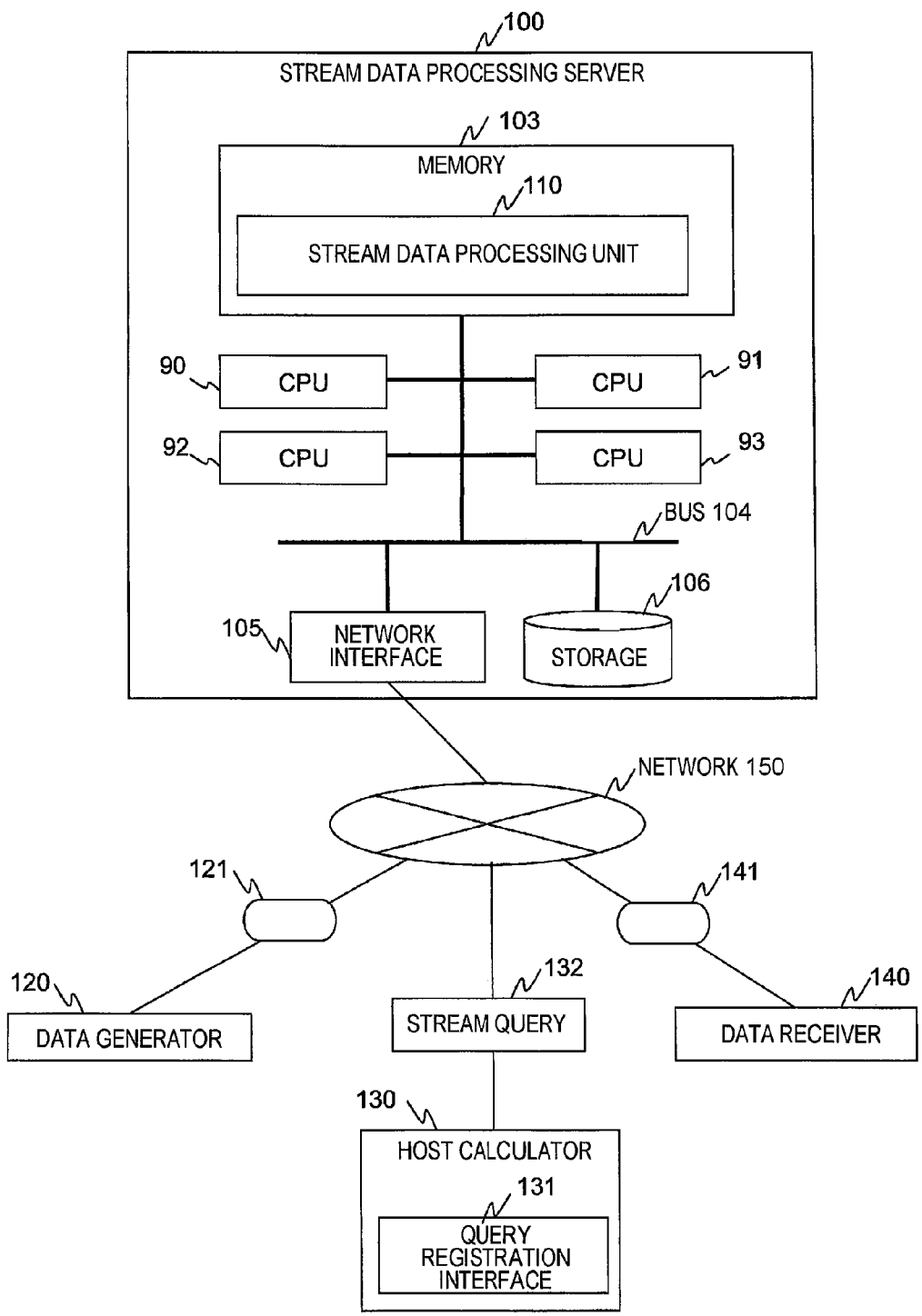
FIG. 1 is a diagram illustrating a calculator environment in which a stream data processing server of an embodiment of the present invention operates.

One example of a calculator environment in which a stream data processing server according to the embodiment of the present invention operates is described using FIG. 1. A stream data processing server 100 is a computer configured by CPUs 90, 91, 92 and 93, a memory 103, network interface 105, storage 106 and a bus 104 that connects them. A stream data processing unit 110 that defines the logical operation of the stream data processing is disposed on the memory 103. The stream data processing unit 110 is an execution image that can be interpreted and executed by the CPUs 90 to 93.

The stream data processing server 100 is connected with an external network 150 through the network interface 105. The stream data processing server 100 receives a stream query 132 defined by the user through a query registration command execution interface 131 that operates on a host calculator 130 connected with the external network 150.

Then, the stream data processing unit 110 constructs a query graph that can execute stream data processing according to the query definition. Afterward, when the stream data processing server 100 receives a tuple 121 transmitted by a data generator 120 connected with the external network 150, the stream data processing server 100 processes this according to the query graph and generates a result tuple 141. This result tuple 141 is transmitted to a data receiver 140 connected with the network 150. The storage 106 stores a text file of the query 132 received once in addition to the execution image of the stream data processing unit 110. The stream data processing unit 110 can load the file of this query from the storage 106 at the time of startup and construct a query graph.

Figure 4:
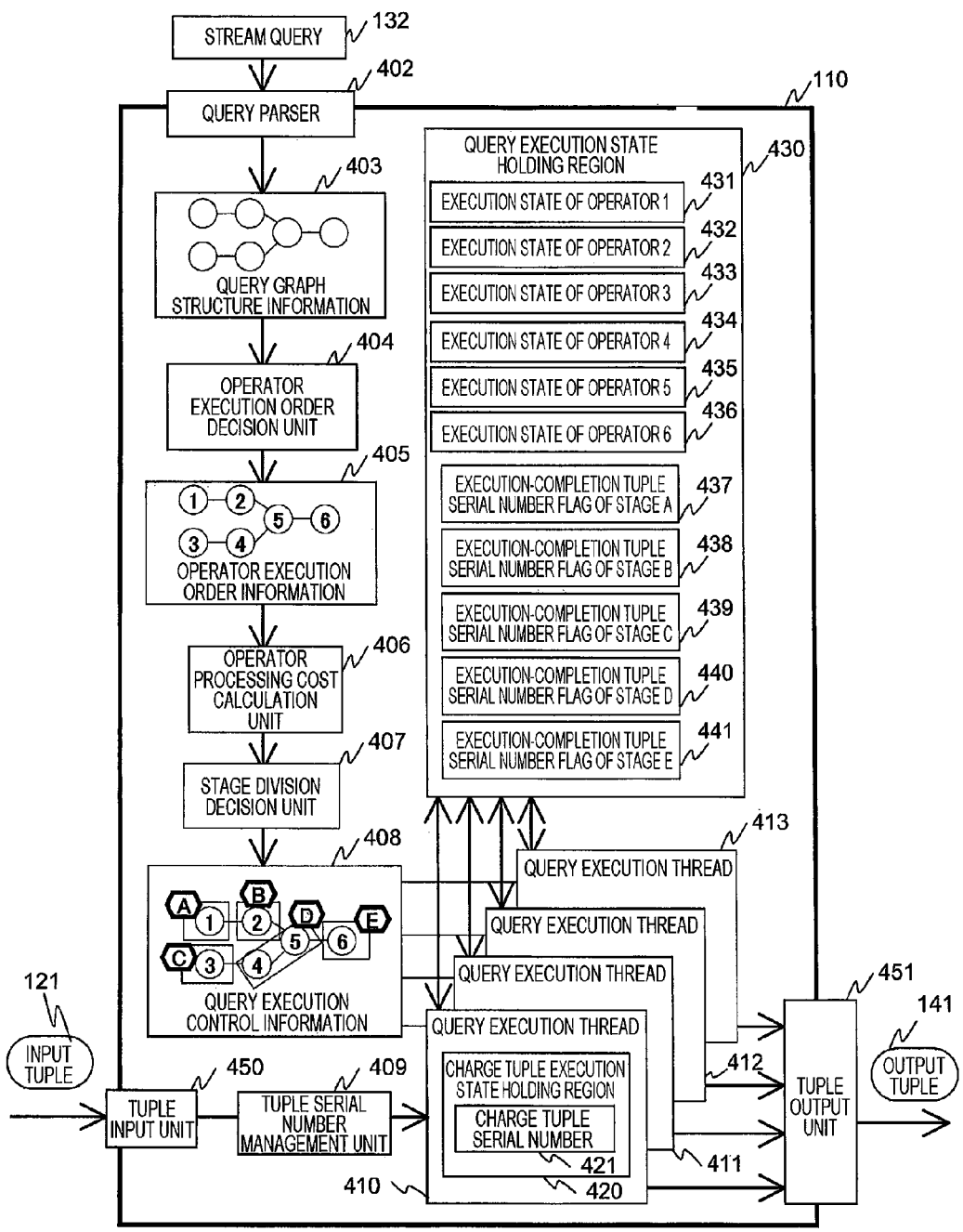
FIG. 4 is a diagram illustrating the configuration of a he stream data processing server according to the above-mentioned embodiment.

The logical configuration of the stream data processing unit 110 is described using FIG. 4. When the user executes registration operation of the stream query 132, a query parser 402 converts the query 132 into query graph configuration information 403. An operator execution order decision unit 404 processes the configuration information 403, decides an execution order between operators configuring a query graph and outputs the execution order as operator execution order information 405. As one realization mode of this processing that decides the execution order between operators, it is possible to use an algorithm described in PTL 3. An operator processing cost calculation unit 406 calculates the processing time estimate of each operator in the query graph as calculation cost and inputs the calculation cost in a stage division decision unit 407. The decision unit 407 divides the above-mentioned query graph into multiple stages.

The stage here indicates a set of one or more consecutive operators in the execution order between operators configuring the above-mentioned query graph. The stage division result is attached to the query graph, and query execution control information 408 is finally generated. In the example of the figure, stages A, B, C, D and E are configured by {operator 1}, {operator 2}, {operator 3}, {operators 4 and 5} and {operator 6} respectively. The operation of the stage division method is described later. As described above, processing at the time of query registration is up to the generation of the query execution control information 408.

Next, operation at the time of query execution is described. At the time of query execution, query execution threads 410 to 413 start operation according to the number of calculation resources in the calculator environment. In this example, a case is assumed where four query execution threads start in an environment in which four CPU cores are available.

Here, when a feature of stream data multiprocessing in this example is described, there is a feature that threads that execute data processing on each tuple that sequentially comes are bound one by one and the processing is advanced in parallel. That is, unlike pipeline processing in which multiple calculation cores take charge of each divided stage and the tuples that sequentially come are transferred between the multiple cores, one calculation core completes processing of multiple divided stages with respect to one tuple. Therefore, when receiving the input tuple 121, a tuple input unit 450 transfers the input tuple 121 to a tuple serial number management unit 409. The tuple serial number management unit 409 assigns integers incremented one by one to individual tuples and transfers the individual tuples to the query execution threads 410 to 413. Among the threads, one of threads whose execution is being paused processes the tuple 121.

Here, it is presumed that serial number 88 is attached to the tuple 121 and the thread 410 takes charge of processing of this tuple. The thread 410 holds this serial number 88 in a local charge tuple execution state holding region 420 as a charge tuple serial number (reference numeral 421 in FIG. 4). Moreover, it is presumed that the thread 413 takes charge of processing of a tuple previous to that tuple, that is, serial number 87.

The thread 410 executes processing in order from stage A on the tuple of serial number 88. Before it is performed, it is confirmed whether the processing of stage A is completed with respect to a tuple previous to the charge tuple of serial number 88, that is, the tuple of serial number 87 charged by the thread 413. This confirmation is realized by comparing the value stored in an execution-completion tuple serial number flag 437 of stage A with charge serial number 88. In this example, each of the query execution threads 410 to 413 rewrites the value of an execution-completion tuple serial number flag of a corresponding stage, which is created in a query execution state holding region 430, from the serial number of the charge tuple (tuple in which the execution of the stage is finished) to the next serial number whenever the execution of each stage for its own charge tuple is finished. The thread 410 confirms the value of the execution-completion tuple serial number flag 437 of stage A, and, in a case where it does not match serial number 88 of its own charge tuple, that is, in a case where processing of stage A of the tuple of previous serial number 87 is not completed, it waits. The thread 413 changes the value of the execution-completion tuple serial number flag 437 from 87 to 88 at the stage at which processing of stage A (that is, processing of operator 1) is completed for the tuple of serial number 87. The confirmation of the execution-completion tuple serial number flag 437 before the execution of stage A by the thread 410 is repeated in a constant period, for example, and processing of stage A for serial number 88 starts at a stage at which the change of this flag value is recognized.

Thus, each query execution thread promotes multiplexing processing according to a protocol that confirms whether the processing of each stage is completed for the previous tuple before the processing of each stage is started, between query execution threads, through execution-completion tuple serial number flags 437 to 441. Here, since the execution state of each of operators 1 to 6 is managed in operator execution states 431 to 436 on the query execution state holding region 430 and shared by all threads 410 to 413, the consistency management by such a protocol is required.

In a case where operators of the interrupted ignition type such as time window operation and delay operation exist in a query graph, it is necessary to also consider the processing order of tuples output by these operators. For example, delay operation with a delay time of four minutes denotes an operator that attaches a time stamp of 10:04 to a tuple in four minutes when the tuple of a time stamp of just 10:00 is input. That is, at the time point at which the tuple of 10:00 is input, the output of the tuple of 10:04 is scheduled. Afterward, it is assumed that all of the query execution threads 410 to 413 are being executed until 10:04 and the query execution thread 410 shifts to an execution-pause state at time that slightly passes 10:04. At this time, in the query execution thread 410, even if a tuple with a time stamp of several micro seconds after 10:04 exists in an input stream, it is necessary to previously execute the output of the tuple with a time stamp of 10:04 scheduled by the delay operation. Therefore, in the interrupted ignition operator, a tuple scheduled to be output next is registered in the tuple serial number management unit 409. The tuple serial number management unit 409 compares the registered tuple and the time stamp of the head tuple of the input stream, assigns serial numbers to them in order from the earlier one and transfers them to the query execution thread.

Figure 5:
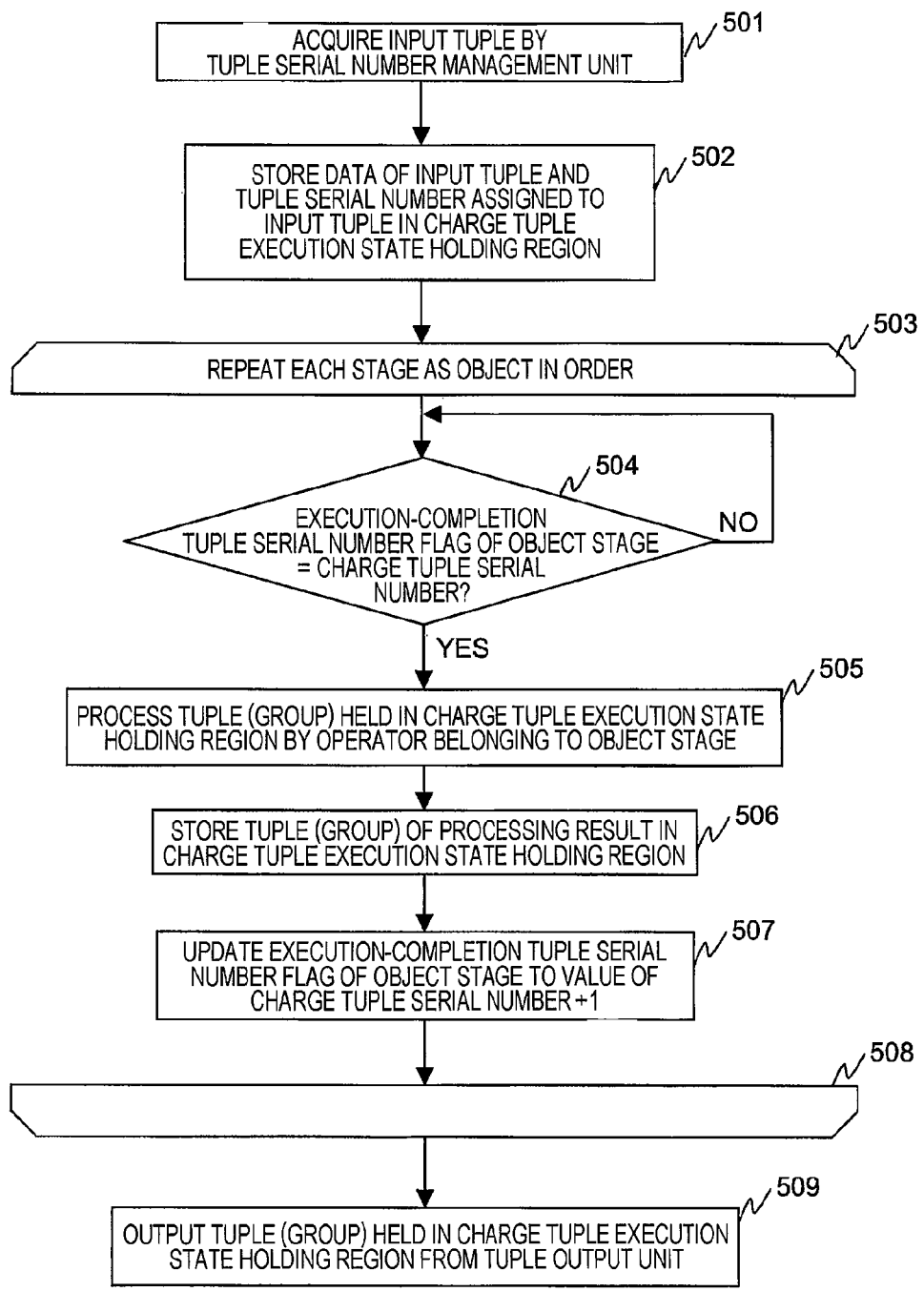
FIG. 5 is a flowchart that describes the operation of a query execution thread of a stream data processing server according to the above-mentioned embodiment.

Next, the operation of each query execution thread is described using the flowchart of FIG. 5. In processing 501, an input tuple is acquired by the tuple serial number management unit 409, and, in processing 502, data of the input tuple and the tuple serial number attached to the input tuple are stored in the charge tuple an execution state holding region 420. Afterward, processing 504 to 507 is repeated for all stages configuring a query graph. Boxes 503 and 508 in FIG. 5 show loop repetition. In first processing 504 of the loop, the execution-completion tuple serial number flags 437 to 441 are confirmed, and a condition diverges depending on whether the value matches the serial number of a charge tuple of the thread. In a case where the value does not match, processing 504 is spin-repeated, and, in a case where the value matches, it proceeds to processing 505.

In processing 505, processing of an operator belonging to the stage is executed on a tuple (group) held in the execution state holding region 420. In processing 506, the result tuple (group) is stored in the execution state holding region 420. Here, depending on the operator, since there is a case where one tuple is input and multiple tuples are output, there can be multiple items of data managed in the execution state holding region 420. In processing 507, since the processing of the stage is completed for the charge tuple, the tuple serial number flag of the stage is incremented by one, and it moves to processing of the next stage. When the processing of all stages is completed, the result tuple is output from a tuple output unit 451 in processing 509, and all processing of the query graph is completed for the charge tuple. The thread enters the pause state again. All query execution threads operate according to the identical flow.

Figure 2:
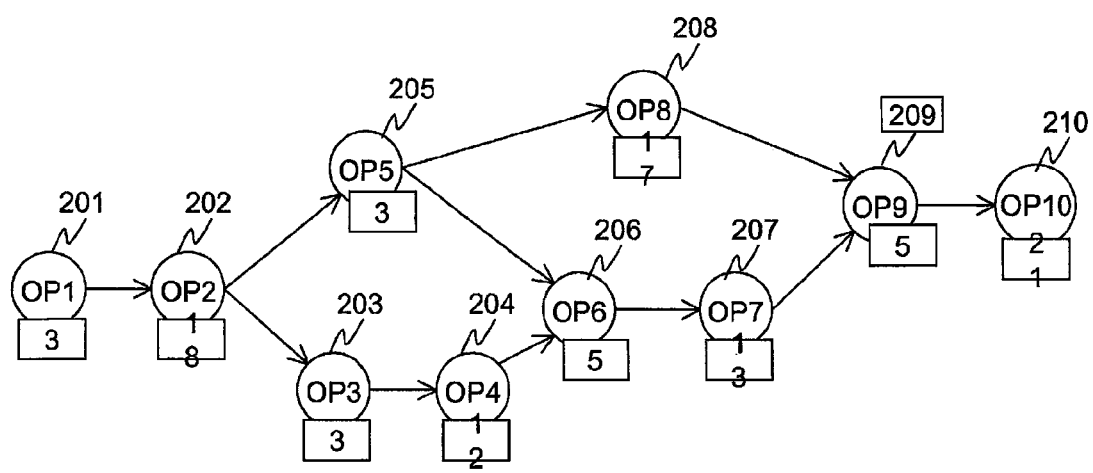
FIG. 2 is an example of a query graph.
Figure 6:
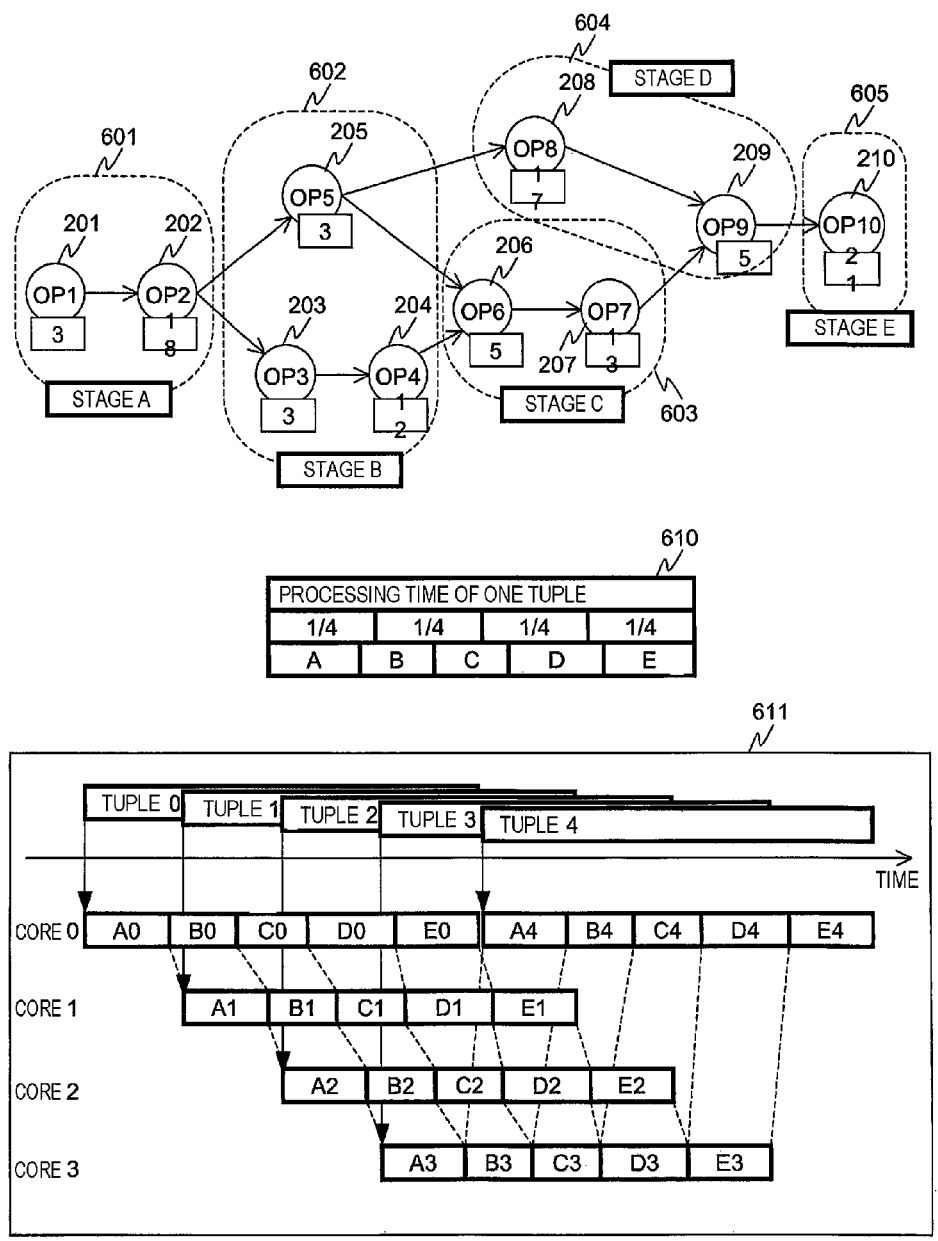
FIG. 6 is a diagram illustrating operation in a multiplexing method of stream data processing according to the above-mentioned embodiment.

Next, a stage division method in the stage division decision unit 407 is described using FIG. 6. In this explanation, the query graph example illustrated in FIG. 2 is assumed to be a sample. Regarding the query graph, the operator execution order decided by the operator execution order decision unit 404 assumes to be the order of OP1 to OP10. Moreover, in this example, query execution in four calculation cores is assumed. First, 22 that takes a margin from 25 that is a value dividing the total calculation cost of the query graph by the number of calculation cores is assumed to be a calculation cost threshold. Operator calculation costs are added according to the operator execution order, and the stages are divided so as not to exceed the threshold.

In this example, since the sum of the calculation costs of OP1 and OP2 becomes 21 and the sum of the calculation costs of OP1 to OP3 becomes 24, first stage A is assumed up to OP2, which is equal to or less than the threshold. In the following, by applying a similar division policy, they are classified into OP3 to OP5, OP6 and OP7, OP8 and OP9, and OP10, and five stages (601 to 605) of stages A to E are finally assumed in total. The calculation cost of each stage is 21 in stage A (601), 18 in stage B (602), 18 in stage C (603), 22 in stage D (604) and 21 in stage E(605). The ratio of the processing time of each stage to the processing time of one tuple is as shown in 610.

Figure 3:
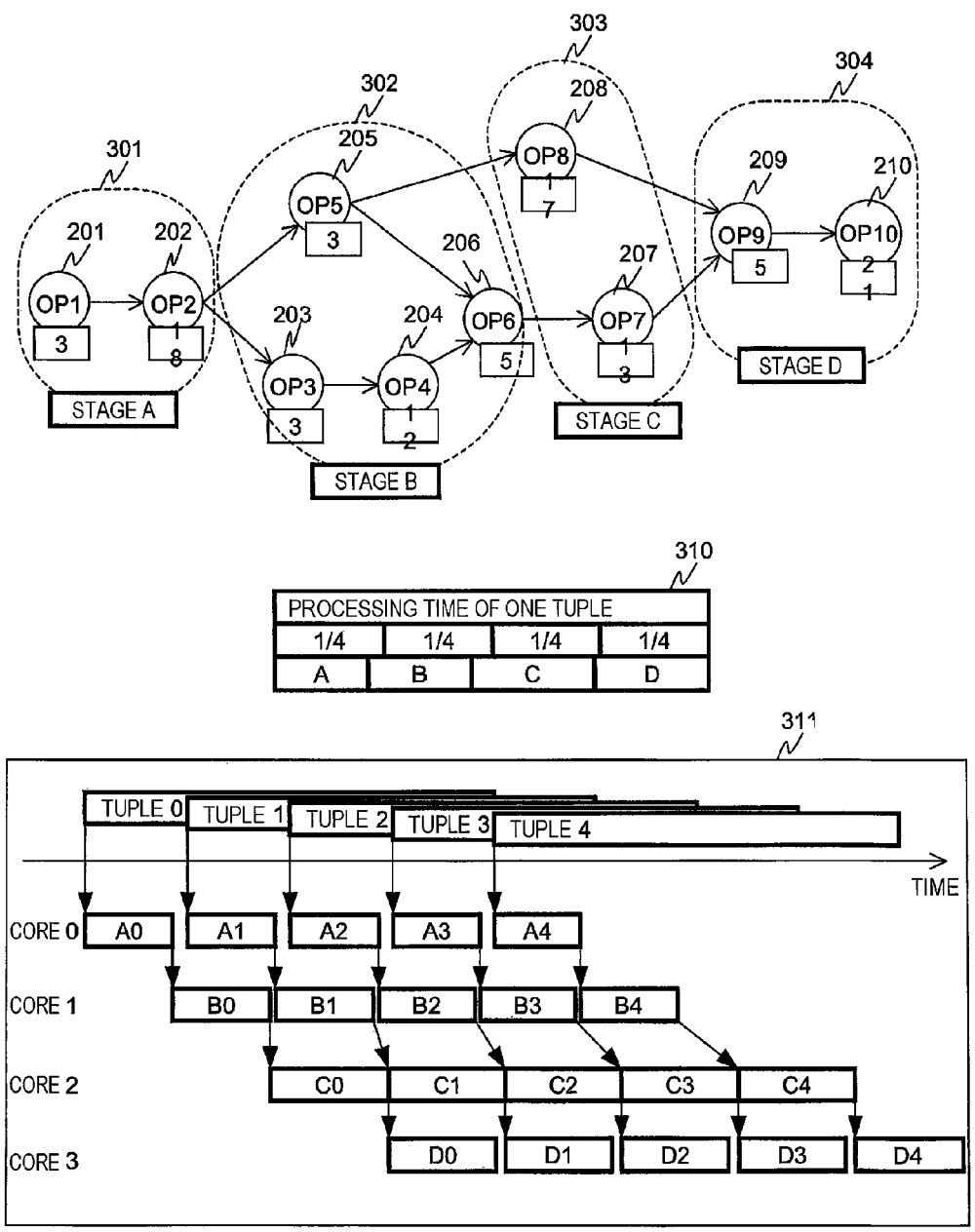
FIG. 3 is a diagram illustrating operation in a multiplexing method of stream data processing in the related art.

Here, in a case where a tuple comes at intervals of ¼ of the tuple processing time, when processing is performed according to the configuration illustrated in FIG. 4 and the flow illustrated in FIG. 5, each tuple is assumed to be managed by a schedule as illustrated in a time chart 611 in each calculation core. Unlike the time chart 311 of FIG. 3, the blank period and waiting of processing do not occur. To be more specific, in query processing by pipeline processing in the related art, even in a so-called ideal input state where a tuple sequentially comes at regular intervals, the processing speed is limited by a stage of the longest processing time as shown in the time chart 311 of FIG. 3, and a processing blank, that is, the blank time occurs in calculation cores that take charge of other stages. By contrast with this, in processing by the protocol of this embodiment, the blank time does not occur at all in an input state where a tuple sequentially comes at regular intervals as shown in the time chart 611 of FIG. 6.

The occurrence of processing wait in a case where the tuple comes at irregular intervals is common in both of pipeline processing in the related art and this embodiment. However, in the protocol of the embodiment of FIG. 6, processing wait occurs in a case where the tuple comes at irregular intervals because, in the example of FIG. 6, the processing cost of each divided stage is not very smaller than the example of FIG. 3. In the above-mentioned explanation, a calculation cost threshold is assumed to be 22 with respect to value 25 dividing the total calculation cost by calculator core number 4, operators are sequentially integrated within a range that does not exceed this threshold, and stages are decided. The occurrence of the blank time when the tuple comes at irregular intervals depends on the size of this calculation cost threshold. When the margin with respect to the value dividing the total calculation cost by the calculator core number is increased, that is, the calculation cost threshold is assumed to a smaller value, the stages charged by calculation cores are divided more precisely and the calculation time of one stage is assumed to be sufficiently short, it is possible to avoid the occurrence of blank time due to a difference in the arrival time of tuples. When the shortest arrival interval by a difference in the tuple arrival time is known, it is possible to completely avoid the occurrence of the blank time by shortening the processing time of the distribution stage of each calculation core more than the shortest arrival interval. Therefore, in this embodiment, it is possible to acquire the effects of low latency and high throughput in not only a limited condition that a tuple sequentially comes at regular intervals but also a condition that the arrival time varies.

Figure 7:
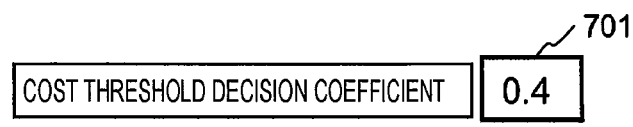
FIG. 7 is a diagram illustrating a user interface screen that sets a cost threshold used in a stage division decision unit according to the above-mentioned embodiment.

The system of this embodiment has a user interface that causes the user to decide a coefficient (cost threshold decision coefficient) related to the setting of a calculation cost threshold used to decide stage distribution between calculation cores in the stage division decision unit 407. FIG. 7 illustrates the user interface screen. In a setting region 701 in the user interface screen, an arbitrary decimal which is larger than 0 and equal to or less than 1.0 can be set as a cost threshold coefficient, and the set value is displayed. The stage division decision unit 407 sets a calculation cost threshold by multiplying a value, which divides the total calculation cost of the query graph by the calculation core number, by the set cost threshold decision coefficient. Operators are sequentially integrated within a range that does not exceed this calculation cost threshold, and stages to be distributed to each calculator core are decided. The user sets the cost threshold decision coefficient according to the tuple arrival state of stream data, and, as a result, it is possible to set the division level of stages distributed to the calculation cores. Therefore, stage division according to the degree of difference in the tuple arrival interval becomes possible, and it becomes possible to virtually avoid the wait and fully use the calculation time of each calculation core. A user interface to decide the above-mentioned cost threshold decision coefficient is realized in a console unit of the stream processing server 100. Alternatively, the above-mentioned user interface may be installed in the host calculator 130.

Variation Example 1

In the above-mentioned embodiment, when operator's execution states 431 to 436 stored in the query execution state holding region 430 are turned over between the query execution threads 410 to 413, there is a possibility that the overhead of cache coherence control between CPU cores becomes a performance degradation factor. Meanwhile, in the time chart 611, there is a slight extension of time during processing in each stage of consecutive tuples. Therefore, in variation example 1, in a calculation core that takes charge of each tuple, before a currently executed stage is completed, the execution state of an operator belonging to the next stage is prefetched in a cache in the calculation core. For example, regarding processing of stage B, there is slight time until processing B1 with respect to a tuple 1 in a subsequent calculation core 1 starts after processing B0 with respect to a tuple 0 in a calculation core 0 ends. Using this period, slightly before processing of the currently executed stage is completed, the execution state of an operator belonging to the next stage is prefetched in a cash of the calculation core. For example, the execution state of operators (OP3 to OP5) belonging to stage B is prefetched immediately before processing A1 of stage A with respect to the tuple 1 in the calculation core 1 ends (that is, processing B1 starts).

By adopting the configuration of variation example 1, it is avoided that the execution state of the operators belonging to stage B on the cash in the calculation core 1 remains as it is dirty at the time point at which processing B1 by the calculation core 1 starts in the above-mentioned example. That is, by prefetch performed within a CPU wait time when query execution is turned over between threads, it is avoided to implement cache coherence control again. To do this effectively, it is preferable to perform the prefetch of the execution state of the operators belonging to stage B in the above-mentioned example at timing at which there is a high possibility that processing B0 of stage B by the calculation core 0 that takes charge of the previous tuple 0 is completed. Especially in a case where a tuple arrival period is stable, it is possible to perform the prefetch of the execution state of the operator belonging to first stage A immediately before the expectation time of the arrival of the next tuple, and it is possible to surely acquire the effect of overhead reduction of cache coherence control.

Variation Example 2

In stream data processing, there is a case where a stream in which multiple tuples come by the identical time stamp is processed. It can be said as a case where a difference in the tuple arrival period which is treated as a problem even in the above embodiments is extremely remarkable. In variation example 2, in a case where tuples of the identical time stamp are consecutive, each of the query execution threads 410 to 413 is assumed to collectively process the continuous tuples.

In this variation example 2, the processing of each stage is sequentially performed on multiple tuples of the identical time stamp in the identical calculation core. Therefore, since the cash hit ratio improves in the calculation core, the shortening of processing time per tuple by the improvement is expected. However, in the case of a stream in which the number of tuples of the identical time stamp greatly varies, the number of tuples distributed to threads becomes variable, that is, the processing time becomes variable, and therefore a processing blank and wait are caused. In a case where the number of tuples of the identical time stamp stably shifts, a processing blank is mitigated, and an effect of improving the throughput of stream processing by the above-described shortening of processing time per tuple is acquired.

Variation Example 3

Figure 8:
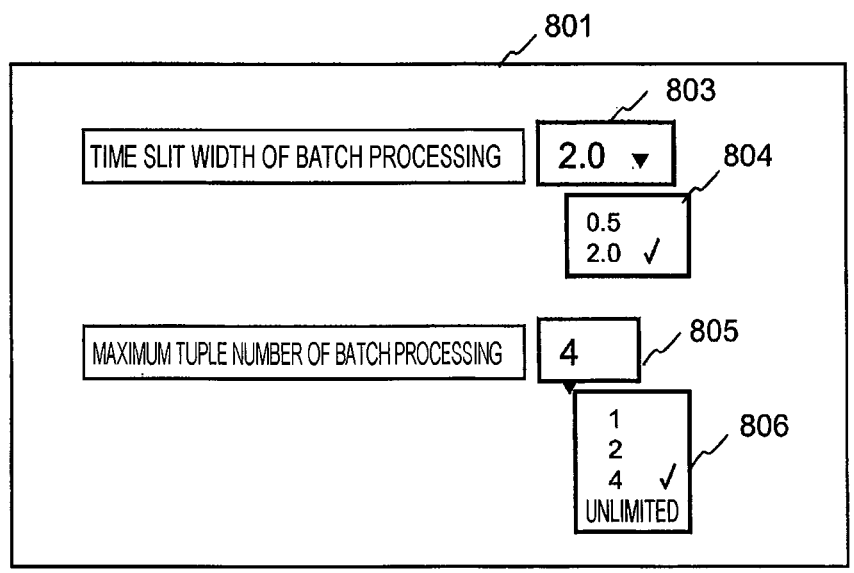
FIG. 8 is a diagram illustrating a user interface screen that perform setting related to batch processing of multiple tuples according to variation example 3 of an embodiment of the present invention.

To mitigate the occurrence of a difference in the processing time of each query execution thread which is caused in above-mentioned variation example 2, more detailed setting is enabled in variation example 3. FIG. 8 illustrates a user interface screen related to the setting of batch processing of multiple tuples in the identical calculator core in example 3. The setting value of a time slit width to determine candidate tuples of batch processing is set to a setting region 803 in a user interface screen 801. A menu of the setting to the setting region 803 is shown in a region 804, and when a check mark is input, a corresponding value (2.0 microseconds in the figure) is set as a time slit width. If a subsequent tuple comes within a period of the set time slit width after the head tuple of an input stream, these tuples become tuple candidates on which one query execution thread in an execution stop state among the query execution threads 410 to 413 performs batch processing. However, the greatest number of tuples subject to the batch processing is set to a setting region 805. A value (4 in the figure) selected from the menu shown in a region 806 is set here too. In this case, even if many tuples come within the above-mentioned period, the number of tuples processed in one thread is four. Here, in a case where "unlimited" is selected from the menu and set, all tuples that come within the set time slit period are subjected to batch processing in one thread. Moreover, in a case where one thereof is selected from the menu and set, the number of tuples for batch processing is one, that is, batch processing of multiple consecutive tuples in one thread is not performed.

Thus, in variation example 3, various settings are possible for batch processing of consecutive tuples, and the user can flexibly perform setting according to an input stream status. Such a user interface screen is installed in either the console of the stream data processing server 100 or the host calculator 130.

Embodiments of the present invention have been described above, but these are illustration to describe the present invention, and do not limit the application range of the present invention to only the exemplified modes. Moreover, any combination of the above-mentioned embodiments may become an embodiment of the present invention.

REFERENCE SIGNS LIST

100 Stream data processing server
90 to 93 CPU
103 memory
104 bus
105 network interface
106 storage
120 Data generator
130 host calculator
131 query registration interface
132 stream query
140 data receiver
121, 141 tuple 150 network
201 to 210 operator
301 to 304 stage in pipeline processing
310 ratio of processing times of stages in pipeline processing
601 to 605 Stage in present invention
610 ratio of processing times of stages in present invention
311, 611 processing time of each stage with respect to each tuple in each calculation core
402 query parser
403 query graph configuration information
404 operator execution order decision unit
405 operator execution order information
406 operator processing cost calculation unit
407 stage division decision unit
408 query execution control information
409 tuple serial number management unit
410 to 413 query execution thread
420 charge tuple execution state holding region
430 query execution state holding region
431 to 436 operator-specific execution state
437 to 441 stage-specific execution-completion tuple serial number
450 tuple input unit
451 tuple output unit
501 to 509 flowchart of query execution thread

The invention claimed is:

1. A stream data multiprocessing method by a stream data processing system which converts a query definition defined by a user for a stream that is a sequence of a plurality of tuples with a plurality of time stamps into a query graph and decides an execution order of a plurality of operators configuring the query graph, and the stream data processing system includes a plurality of query execution threads for executing the query graph, the method comprising:

dividing the query graph into a plurality of stages, and two or more of the stages each include a respective set of multiple consecutive operators;

extracting a first tuple positioned at a head of the stream at a time point in which a first query execution thread is in an execution stop state among the query execution threads;

sequentially processing the stages for a second tuple positioned previous to the first tuple in the stream with a second query execution thread;

confirming whether processing in a first stage, which is to be executed first among the multiple stages, has been completed by the second query execution thread for the second tuple;

executing sequential processing of the stages on the first tuple with the first query execution thread as soon as completion of the processing of the first stage for the second tuple is confirmed;

confirming whether processing in a second stage, which is to be executed in sequence after the first stage, has been completed for the second tuple by the second query execution thread as soon as the processing of the first stage for the first tuple has been completed by the first query execution thread; and executing sequential processing of the second stage for the first tuple with the first query execution thread as soon as completion of the processing of the second stage for the second tuple is confirmed, wherein the execution of the second stage for the second tuple and the execution of the first stage for the first tuple occur in parallel simultaneously, and wherein, before completion of the processing of the first stage for the first tuple, the first query execution thread confirms whether the processing in the second stage for the second tuple is completed, and prefetches an execution state of the processing of the second stage in a cache memory.

2. The stream data multiprocessing method according to claim 1, wherein processing of dividing the query graph into the plurality of stages includes a procedure of:

setting a cost threshold which is a value equal to or less than a sum of processing costs of all of the operators divided by a number of the query execution threads; and dividing the query graph into the respective stages such that a total processing cost of the respective operators configuring each of the stages does not exceed the cost threshold.

3. The stream data multiprocessing method according to claim 2, further comprising:

setting a product of a value dividing the total processing cost of all of the operators by the number of query execution threads and a coefficient which is greater than 0 and equal to or less than 1.0 and which is selected by the user, as the cost threshold.

4. The stream data multiprocessing method according to claim 1, wherein, when the query graph includes an interrupted-ignition-type operator which is one of a time window and a delay operator, a time stamp of third tuple of the tuples which is generated by the interrupted-ignition-type operator and a time stamp of the first tuple of the input stream are compared, and processing is performed in order starting with the one of the first tuple and the third tuple having an earlier time stamp.

5. The stream data multiprocessing method according to claim 1, wherein:

the first query execution thread in the execution stop state extracts plural tuples which are consecutively positioned at the head of the stream at the time point and which have identical time stamps, and the first query execution thread executes sequential processing on the plural tuples as soon as completion of the processing of the first stage for the second tuple is confirmed until processing of all stages is completed for the plural tuples.

6. The stream data multiprocessing method according to claim 1, wherein:

the first query execution thread in the execution stop state extracts plural tuples which are consecutively positioned at the head of the stream at the time point within a time stamp range designated by the user, and the first query execution thread executes sequential processing on the plural tuples as soon as completion of the processing of the first stage for the second tuple is confirmed until processing of all stages is completed for the plural tuples.

7. A stream data processing method by a stream data processing system which includes a plurality of processors for parallel processing of a stream that is a sequence of a data, the method comprising:

dividing a query graph including a plurality of operators into a plurality of stages that each include a respective set of two or more of the operators, respectively;

deciding a number of the stages based on a number of the processors;

assigning the data of a first tuple of the stream, which is inputted to the stream data processing system, to a first processor of the processors;

confirming whether the data of a second tuple previous to the first tuple has completed processing in a first stage of the stages by a second processor of the processors;

starting to execute processing of all of the stages for the first tuple by the first processor after the processing in the first stage for the second tuple has completed by the second processor; and continuing to execute processing of the stages following the first stage for the second tuple by the second processor in parallel with the processing of the stages for the first tuple by the first processor, wherein processing of dividing the query graph into the plurality of stages includes a procedure of:

setting a cost threshold which is a value equal to or less than a sum of processing costs of all of the operators divided by a number of the query execution threads; and dividing the query graph into the respective stages such that a total processing cost of the respective operators configuring each of the stages does not exceed the cost threshold.

* * * * *